(12) United States Patent
Eromaki

(10) Patent No.: US 8,082,631 B2
(45) Date of Patent: Dec. 27, 2011

(54) FOLDING MECHANISM FOR COMPACT DEVICE

(75) Inventor: Marko Eromaki, Tampere (FI)

(73) Assignee: Nokia Corporation, Espoo (FI)

( * ) Notice: Subject to any disclaimer, the term of this patent is extended or adjusted under 35 U.S.C. 154(b) by 1045 days.

(21) Appl. No.: 11/765,146

(22) Filed: Jun. 19, 2007

(65) Prior Publication Data

US 2008/0313857 A1 Dec. 25, 2008

(51) Int. Cl.
*E05D 15/32* (2006.01)
(52) U.S. Cl. ..................... 16/370; 361/679.27
(58) Field of Classification Search ............. 16/367, 16/302, 282, 294, 366, 287, 370, 288; 455/575.3; 379/433.13; 361/679.27; 248/917–923
See application file for complete search history.

(56) References Cited

U.S. PATENT DOCUMENTS

| | | | | |
|---|---|---|---|---|
| 5,337,452 A * | 8/1994 | LeBlanc et al. | ................. | 16/367 |
| 5,907,615 A * | 5/1999 | Kaschke | ................. | 379/433.12 |
| 6,353,529 B1* | 3/2002 | Cies | ................. | 361/679.05 |
| 6,612,668 B2* | 9/2003 | Doan | ................. | 312/223.2 |
| 6,628,244 B1* | 9/2003 | Hirosawa et al. | ................. | 345/2.3 |
| 6,643,124 B1* | 11/2003 | Wilk | ................. | 361/679.04 |
| 6,704,417 B2* | 3/2004 | Kim | ................. | 379/433.07 |
| 6,898,073 B2* | 5/2005 | Lin | ................. | 361/679.08 |
| 6,980,425 B2* | 12/2005 | Chuang et al. | ................. | 361/679.06 |
| 6,989,984 B2* | 1/2006 | Sutton et al. | ................. | 361/679.16 |
| 7,054,146 B2* | 5/2006 | Sutton et al. | ................. | 361/679.28 |
| 7,130,669 B2* | 10/2006 | Moon | ................. | 455/575.3 |
| 7,138,962 B2* | 11/2006 | Koenig | ................. | 345/1.3 |
| 7,333,321 B2* | 2/2008 | Sutton et al. | ................. | 361/679.09 |
| 7,336,979 B2* | 2/2008 | Soejima | ................. | 455/575.1 |
| 7,400,908 B2* | 7/2008 | Lehtonen | ................. | 455/566 |
| 7,489,503 B2* | 2/2009 | Maatta | ................. | 361/679.27 |
| 7,496,378 B2* | 2/2009 | Kawamura | ................. | 455/556.1 |
| 7,508,411 B2* | 3/2009 | Boesen | ................. | 348/14.02 |
| D590,365 S * | 4/2009 | Kim et al. | ................. | D14/138 AB |
| 7,606,605 B2* | 10/2009 | Lee et al. | ................. | 455/575.3 |
| 7,610,067 B2* | 10/2009 | Cho et al. | ................. | 455/575.3 |
| D609,203 S * | 2/2010 | Birsel et al. | ................. | D14/138 R |
| 2003/0161094 A1* | 8/2003 | Chambers | ................. | 361/681 |
| 2004/0052044 A1 | 3/2004 | Mochizuki et al. | | |
| 2005/0159194 A1* | 7/2005 | Heintz et al. | ................. | 455/575.3 |
| 2005/0164752 A1 | 7/2005 | Lau et al. | | |

(Continued)

FOREIGN PATENT DOCUMENTS

DE 29704171 U1 * 5/1997

(Continued)

OTHER PUBLICATIONS

International Search Report and Written Opinion for PCT/EP2008/002991, dated Sep. 2, 2008.

*Primary Examiner* — William L. Miller
(74) *Attorney, Agent, or Firm* — Alston & Bird LLP

(57) ABSTRACT

A device is provided which includes at least four device parts, a first hinge element foldably connecting a first device part and a second device part along one edge of said first and second device parts; a second hinge element foldably connecting a third device part and a fourth device part, a third hinge element foldably connecting said first device part and said third device part, and a fourth hinge element foldably connecting said second device part and said fourth device part.

17 Claims, 6 Drawing Sheets

U.S. PATENT DOCUMENTS

| | | | |
|---|---|---|---|
| 2006/0100004 A1* | 5/2006 | Kim et al. | 455/575.3 |
| 2007/0072657 A1* | 3/2007 | Hyun et al. | 455/575.3 |
| 2007/0084014 A1 | 4/2007 | Tseng | |
| 2008/0064452 A1* | 3/2008 | Kim et al. | 455/575.3 |
| 2008/0125198 A1* | 5/2008 | Kim | 455/575.3 |
| 2008/0167095 A1* | 7/2008 | Kim et al. | 455/575.3 |
| 2009/0104932 A1* | 4/2009 | Chiang | 455/556.1 |
| 2009/0156263 A1* | 6/2009 | Park et al. | 455/566 |
| 2010/0004037 A1* | 1/2010 | Ozawa | 455/575.3 |
| 2010/0041439 A1* | 2/2010 | Bullister | 455/566 |

FOREIGN PATENT DOCUMENTS

| | | | |
|---|---|---|---|
| DE | 10053790 A1 | * | 5/2002 |
| JP | 2000068883 A | * | 3/2000 |
| JP | 2006086564 A | * | 3/2006 |
| WO | WO 2005020046 A1 | * | 3/2005 |
| WO | WO 2007143530 A2 | | 12/2007 |

* cited by examiner

FOLDING MECHANISM FOR COMPACT DEVICE

FIELD OF THE INVENTION

The present invention is related to foldable devices, and in particular to a folding mechanism for obtaining a very compact, palm-sized device.

BACKGROUND ART

Many mobile devices, in particular electronic communication devices and media devices, are designed as foldable or slidable devices in order to provide small-size mobile devices which still have extensive functionality when opened. In some cases, the folding allows to protect some of the functional elements from damage by folding them into a rigid shell. In others, the functionality of a device may differ in closed and opened position. For example, a keyboard will always require a certain amount of space due to the large number of keys and the size of a human finger. Laptops and other mobile computing devices which include keyboards are generally folded in half, with the keyboard on one device half and the display on another. Also, large display screens are desirable on many electronic devices, e.g. for ease of handling and reading characters on a screen, or for viewing multimedia content on a mobile device.

SUMMARY

In accordance with the present invention, a device is provided comprising at least four device parts, a first hinge element foldably connecting a first device part and a second device part along one edge of said first and second device parts; a second hinge element foldably connecting a third device part and a fourth device part, a third hinge element foldably connecting said first device part and said third device part, and a fourth hinge element foldably connecting said second device part and said fourth device part.

In some embodiments, the device part edges connected to said first and second hinges are essentially orthogonal to said device part edges connected to said third and fourth hinges.

According to exemplary embodiments of the invention said device parts are essentially tabular in shape.

Said first and second hinge elements may in some embodiments both have a first hinging direction. Also, said third and fourth hinge elements may in exemplary embodiments both have a hinging direction opposite to said first hinging direction.

The device may in some embodiments comprise said third and fourth device parts including a display screen. Said display screen may for example include a flexible display screen laminated onto a front side of said device parts. In some embodiments, said display screen may extend across a contact edge of said third and fourth device parts.

According to an exemplary embodiment of the invention, said first and second device parts include user input means. Such user input means may for example comprise a keyboard. In some embodiments, the keyboard may be divided onto said first and second device parts.

In accordance with some embodiments of the invention, said hinge elements may allow said device to assume at least a closed position and an opened position.

Furthermore, in said opened position a solid angle between said first device part and said third device part, or between said second device part and said fourth device part, may in some embodiments be between 90 and 180 degrees.

According to some embodiments, said first and second device parts are arranged in one common plane in said opened position.

In exemplary embodiments, said first and second device parts are located on top of each other in said closed position.

Also, the surface area of said device in said closed position may approximately be one fourth of the surface area of said device in said opened position, according to exemplary embodiments.

According to some embodiments of the invention, said device parts have essentially similar surface areas.

Furthermore, the outer edges of said device parts may be essentially flush in said closed position in some embodiments.

In some examples, the sum of included angles between the respective hinge elements may be less than 360 degrees.

According to further embodiments of the invention, said included angles between said first and third hinge element and/or said first and fourth hinge element are less than said included angles in between said second and third hinge element and/or said second and fourth hinge element. In exemplary embodiments of an inventive device, said included angles between said second and third hinge element and/or said second and fourth hinge element are greater than 90 degrees.

In further exemplary embodiments, at least one of said hinge elements is provided with flexible printed circuits for electrical connection between said device parts.

BRIEF DESCRIPTION OF FIGURES

In the following, exemplary embodiments of the invention will be described in more detail with reference to the appended figures, wherein.

It shall be noted that the examples shown and described are merely intended for explanatory purposes, and the invention is not limited to those examples.

DESCRIPTION OF EXEMPLARY EMBODIMENTS

Figure 1:
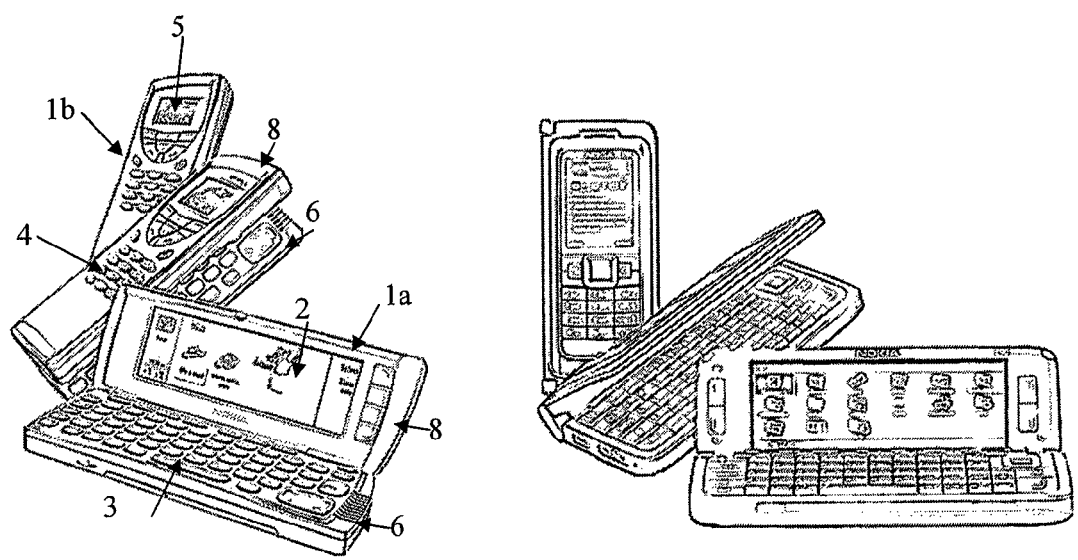
FIG. 1 shows examples of foldable prior art devices.

In FIG. 1, prior art devices 1 with folding mechanisms are shown. One example is the Nokia Communicator, which has amongst other elements a keyboard 3 and a separate display 2. On the outside of the device parts, further functional elements may be present for operating at least part of the device also in a closed position. In the example case, a smaller display element 5 is included on the outer shell, along with several buttons 4 for user input and a speaker/microphone combination. This may allow using the device 1 in closed position 1b as a phone with arbitrary functions such as a clock display, media player, and so on. For further operations, the device may be folded open 1a to reveal more functional elements, e.g. a larger display 2 and a full keyboard 3. Especially a keyboard with a rather fixed number of keys, but also a desired display size set a limit for a potential diminishment of device size. This limit may lead to a conflict of interest between reduced form factors in closed position and lightweight construction on one hand and practical, spacious elements for increased functionality on the other hand.

In between the two separate device parts 6 and 8, at least one hinge element is arranged such that a complete folding motion is achievable between a closed and an open position. In open position, a full keyboard and a display may be accessible for extended functionality. A device may thus be used as a small size computer or personal digital assistant in this position without being restricted to the limited input features of a phone keypad. After folding the device into a closed position 1b, the inner functional elements will be guarded from external influences. Further elements on the outside may still allow a user to utilize specific features of the device, such as a phone feature. One or more hinge elements may be used at the connecting edge of the device parts, and the technical details of these hinges may vary. Common solutions include pivot hinges extending from the device shells.

Besides the elements shown in the example of FIG. 1, further operational and functional items may be present on a device. Devices that may apply embodiments of the invention for connecting device parts may also be other electronic device types, such as laptops and palm top computers with foldable display elements; foldable keyboards; media players; and many more. The person skilled in the art will easily consider a multitude of other devices and gadgets which may benefit from the proposed folding mechanism. Also, the functional elements present on these devices are not limited to those described in the present example, but rather may include all kind of operating elements, processing elements and signaling elements which may be used within electronic devices. Further examples for functional elements included are LEDs or other optical signaling elements; sensors of various kinds such as temperature, optical, acoustical or motion sensors; connectors of any kind; active and passive electronic circuits; touch screens; vibrating elements; volatile or non-volatile memory elements, e.g. hard disks, integrated flash memory elements, or memory cards; antennas, receiver/transmitters for wireless or wired communication; rechargeable or non-rechargeable power supplies; and many other functional elements known in the art.

With the folding concept shown in FIG. 1, a device in closed position will still take up at least half of the size of an opened device (operational position). When larger keyboards or display elements are desired, this will also have a substantial effect on the closed device size. Furthermore, the closed device shape is usually very asymmetric and not really compact, with a considerable length along the folding edge and a smaller width due to the folding in the middle.

Figure 2:
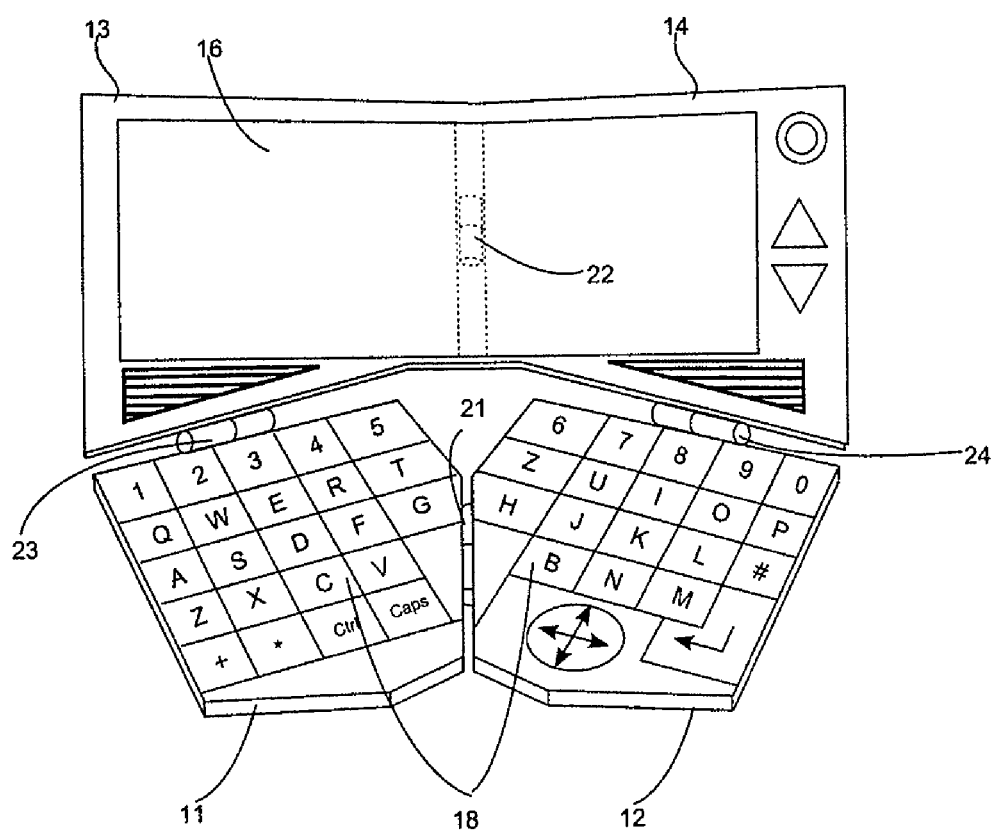
FIG. 2 is a front and perspective side view of an exemplary embodiment of the invention.

FIG. 2 illustrates an example embodiment 10 of the present invention. Instead of two separate device parts as in the prior art example of FIG. 1, this embodiment basically includes four device parts 11, 12, 13, 14. In other embodiments, the number of device parts may vary. While the functional elements on these parts may comprise any desired elements, the example will be given on the basis of a display 16 and a keyboard 18, each essentially divided into two parts. The keyboard 18 may be completely separated into two device parts, since the single keys may be arranged in any arbitrary way and do not need to be connected directly to other keys. A display 16 may be provided in the form of a continuous foldable display. In this case, the two display device parts 13 and 14 may also be regarded as a single foldable device part, thus sectioning the device into at least three separate parts. Separate back parts 13 and 14 may be present which are connected together by a laminated flexible display 16 to form the display part. Another alternative is a display including two or more separate display screen elements 13 and 14, which may e.g. have a very thin frame around the display in order to provide good visibility even across several screen sections. For the sake of clarity, the functional elements of the device may not be depicted in all of the below figures.

The separate device parts 11, 12, 13, 14 are then connected together by connecting elements, such as hinges or joints 21 to 24. Along or in the hinges, electrical connections may be provided in between the device parts. Such connections may be obtained by flexible printed circuits (FPC), wires or other suitable conductive materials; for example, signal connections may be provided as optical connections. In the exemplary embodiment of FIG. 2, a first and a second device part 11 and 12 are shown which include the keyboard 18 and similar functions. Of course, the presence of a keyboard is not required and only chosen to exemplify the folding concept according to this embodiment of the invention, and different elements may be selected in other devices according to their intended field of application. These first and second device parts 11, 12 are essentially of the same area and are arranged in a mirrored configuration in this example. Along their contact edges, the device parts are connected by a first hinge 21. The hinge 21 is in this example mounted such that a folding motion may be performed that will result in the back faces of the keyboard parts 11, 12 lying on top of each other. A third 13 and a fourth device part 14 include the display 16, which is in this case realized by a bendable or flexible display element. Displays of this kind may include electrophoretic displays, LCD displays, OLED displays or any other suitable flexible display material. The displays may further allow user input via touch screen functionality. Size and thickness of the display may vary. In order to stabilize a flexible display and for accommodating functional elements on or in the device parts, the third 13 and fourth 14 device parts may comprise two separate back support parts on which the actual display element is mounted in a laminar fashion. The flexible display extends across the gap between the third and fourth device part. Thus, the flexible display screen itself provides a hinge function between those separate back parts, i.e. act at least in part as a second hinge element 22. Additional flexible connections between the supporting parts may be provided in parallel in order to decrease stress on the display. It will be understood by the person skilled in the art that the display may alternatively include two completely separate device parts 13, 14 which may each have a separate display screen or any other desired elements. The separate device parts could then be connected by a second mechanical hinge element 22 similar to that connecting the first and second device parts. In other exemplary embodiments, a mechanical hinge 22 may be combined with a flexible display 16 across both device parts in order to provide a secure and smooth folding motion. In both cases, the folding direction or hinging direction of the first hinge element 21 may be the same as the folding direction of the second hinge element 22.

Furthermore, the first 11 and third 13 device parts and the second 12 and fourth 14 device parts are connected together via third 23 and fourth 24 hinge elements. Again, the hinge elements are connected along contact edges of the respective device parts. The hinge axes of the first and second hinge elements 21 and 22 may essentially extend along a common line, and the hinge axes of the third and fourth hinge elements 23 and 24 may be essentially orthogonal to those of the first and second hinge element 21, 22. It will be seen that the angle of these axes may have an effect on the shape that the device will assume in opened position, and the respective angles may thus also be less or greater than 90 degrees. In FIG. 2, the angle between the first and third or first and fourth hinge element is less than 90 degrees, while the angle between the second and third or second and fourth hinge elements is greater than 90 degrees. The shapes of the respective device parts are adapted to these selected angles, as can be seen from the figure. Therefore, the display element 16 comprising the third and fourth device part is not exactly rectangular in this example, but has two drawn-out corners at its lower connecting edge, following the angles of the connecting hinges 23 and 24.

Figure 4:
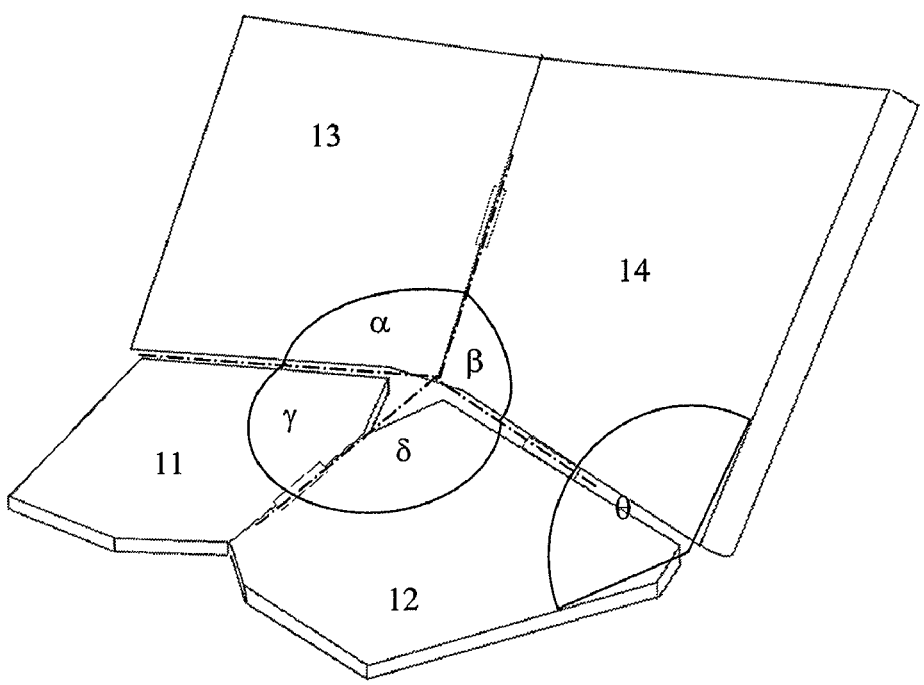
FIG. 4 indicates several angles on an exemplary embodiment of the invention.

It will be seen from the above explanations and also from the appended figures that these hinge configurations in opened position may allow a flat arrangement of the first and second device parts, i.e. the keyboard parts 11 and 12 in the above example, and the third and fourth device parts 13 and 14 will essentially be fixed at a given angle with respect to the keyboard plane (first and second parts). The magnitude of the solid angles obtained in open position will depend from the shape and connection angles of the separate device parts, as will be shown in connection with FIG. 4. Overall, it is possible to define a device shape such that the device 10 will automatically assume an ergonomic configuration when opened. For example, the keyboard parts 11 and 12 may arrive at a flat position after opening, with both keyboard parts arranged in a common plane. This allows an easy keyboard handling and comfortable use of the keys when the device is placed on a surface such as a table. The angles and shapes may then be selected such that the display section of the device, including the third and fourth device parts 13 and 14 in this example embodiment, will not lie flat on the same surface, but rather stand up with a preset inclination angle. Relevant angles may be defined by the hinge axes. For a device assuming a completely flat configuration when opened, the sum of all angles $\alpha$, $\beta$, $\gamma$, $\delta$ between the respective hinge axes is 360 degrees. When this sum of angles is reduced, a flat configuration cannot be achieved any more, and some device parts will therefore be inclined against others in the opened position. In the examples of FIGS. 2 and 4, angles enclosed by the first and third hinge elements ($\gamma$) or the first and fourth hinge elements ($\delta$) are less than 360 degrees, while angles enclosed by the second and third hinge elements ($\alpha$) or second and fourth hinge elements ($\beta$) are greater than 360 degrees, and in particular greater than the lower angles with the first hinge elements ($\alpha$, $\beta > \gamma$, $\delta$). Still, the sum of all these angles is less than 360 degrees, which results in the angled opened position as shown. As long as the respective angles $\alpha$ and $\beta$ between second and third/fourth hinge elements are greater than 90 degrees, the opening angle $\theta$ of the device (i.e. the solid angle between the second 12 and fourth 14 device part, or first 11 and third 13 device part) will be more than 90 degrees. While a symmetric configuration of parts and angles has been shown in this example, asymmetric designs are also conceivable.

Figure 3:
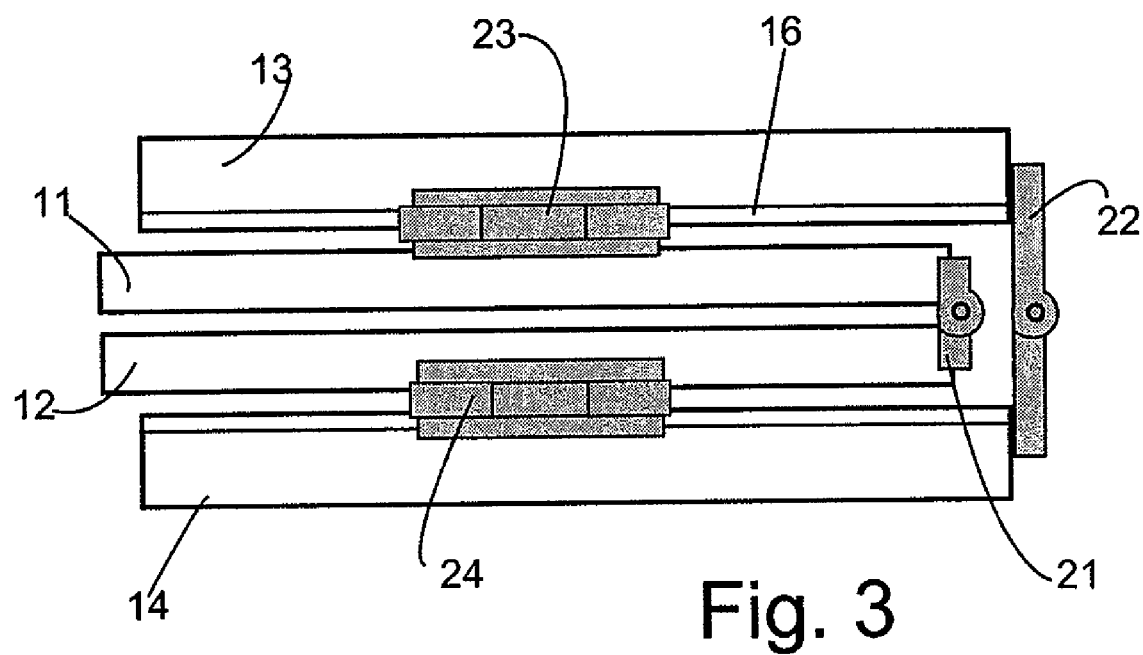
FIG. 3 illustrates a closed device position of an exemplary embodiment.

In closed position as in the illustration of FIG. 3, the device of this example will assume a very compact shape, occupying only about one quarter of the surface area of a fully opened device. The back sides of the first 11 and second device parts 12, i.e. the keyboard parts in the example, will get to lie on top of each other, and the front faces of the third 13 and fourth 14 device parts (the display parts) will fold around the functional front sides of the first and second device part 11 and 12. When completely closed, the only visible faces on the outside are made up of the display back sides, i.e. the back sides of the back support parts 13, 14 connected to the display, or alternatively the back sides of the two separate display parts 13, 14. All functional elements of the opened position, such as the display screen 16 itself, are concealed and protected from external impact. The back sides of the third and fourth display parts, constituting the outer faces of the closed device, may comprise a rigid shell for protection. Optionally, further functional elements may be arranged on these faces, such as a small display or alarm element, a few keys or button for easy accessibility of device functions, or a microphone and speaker for phone functionality. In some embodiments, latches or similar fastening elements may be attached at the edges of these outer parts in order to keep the device in a closed position and prevent unintentional opening.

Figure 5:
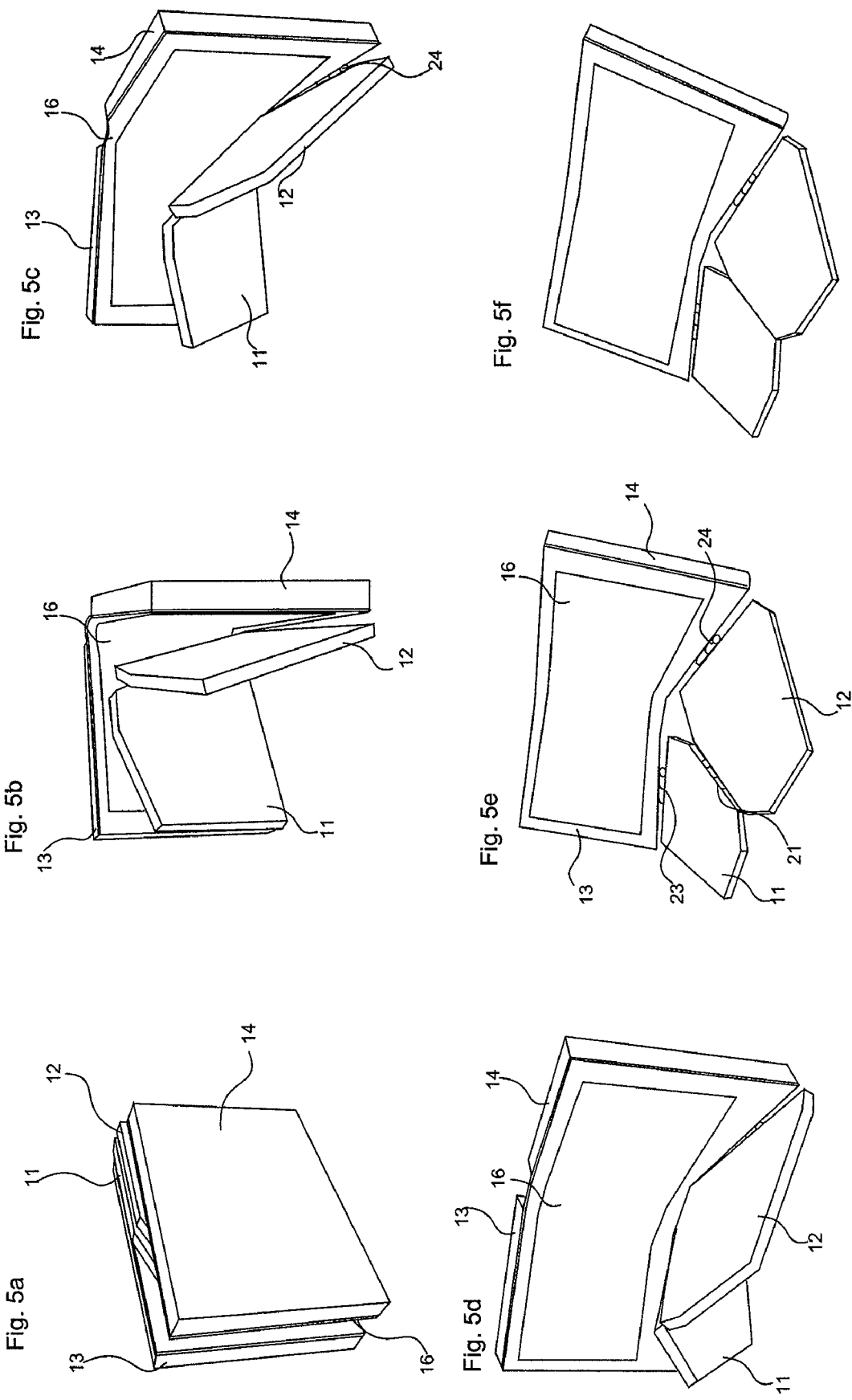
FIG. 5 shows exemplary steps of unfolding a device according to an embodiment of the invention.

In FIG. 5, an exemplary opening sequence according to the invention is shown for an example device embodiment. FIG. 5a is a closed device position, showing only the two sections of the third device part, which will in opened position present the display screen. In between the folded outer device parts, edges of the first and second device parts can be seen. These edges of the inner device parts may be protruding slightly in opened position or may alternatively be completely within the outer parts, depending on the exact size and shape of each device part. FIG. 5b illustrates a first folding step. The third device part (or their two respective rigid back parts) is folded open, revealing the back side of the first and second device part. Due to the arrangement of the hinges and the shape of the parts, the opening in this direction will at the same time cause unfolding of the first and second device part from the third device part, i.e. simultaneous unfolding along the third and fourth hinge element is automatically achieved by unfolding along the first (and second) hinge element. In FIG. 5c, it can be seen that the display parts have already unfolded to some extent, and the lower parts (first and second device parts) are now further unfolded downwards, either manually or partially due to gravitational force. FIGS. 5d and 5e illustrate how the device is unfolded into a completely opened position by moving the first and second parts away from the third and fourth parts, and by moving the first and third part away from the second and fourth parts. In FIG. 5f, the device has been opened completely and has thus assumed its other extreme position, which allows full access to all functional elements. The flat lower device section, comprising the first and second device parts such as a keyboard, may then be conveniently placed on a user's palm, a table or another suitable surface for operation, as indicated. The display section comprising the third and fourth device parts is inclined with respect to the surface, depending on the selected hinge/part angles as explained above.

Figure 6:
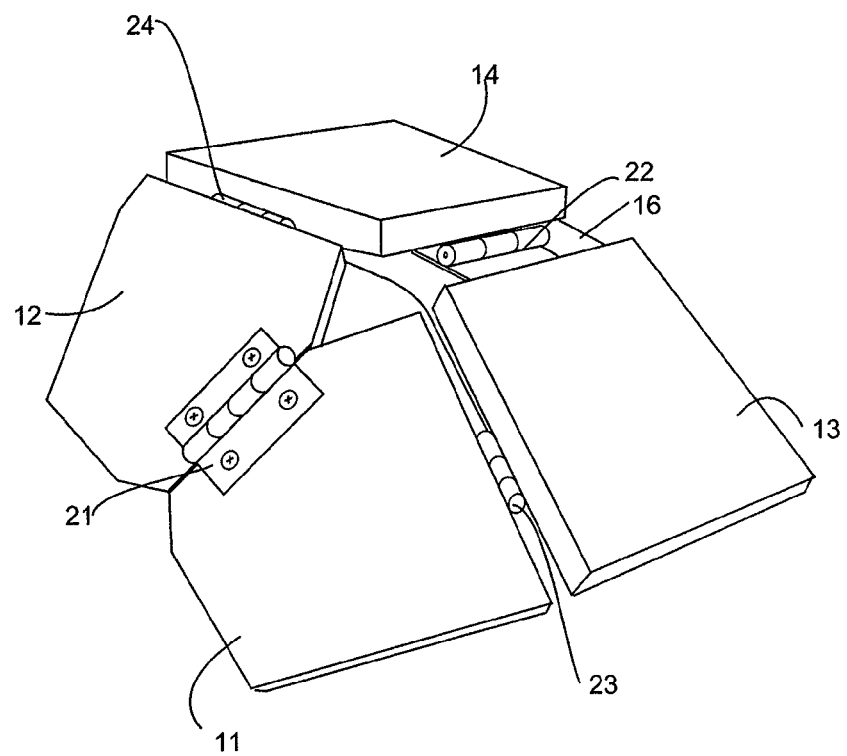
FIG. 6 is a backside view of an exemplary embodiment of the invention.

FIG. 6 shows a back view of an opened device such as that of FIGS. 2 to 5. Once more, the four hinge elements 21, 22, 23, 24 in between the separate device parts can be seen. While in this example, there are no functional elements on the back sides of the device parts, in other embodiments there may also be further elements present, which may then be accessible and visible also in a closed position. Flexible printed circuits, wires, or other suitable connection means may be present within the hinges or next to the hinges in order to connect the separate device parts for electrical power supply and signal transmission. Since all device parts are connected along two of their edges, it is not necessary to include connections into all hinge elements; for example, a processor and power supply may be provided within the third 13 and fourth 14 device part, and thus connections would only be required in the hinges connected to those parts. The actual location and number of electrical or also optical connections may depend on the desired functionality of each of the device parts.

It will be understood that, depending on ease of movement of the hinges, the proposed exemplary folding concept may allow for opening a device into an operational position with a simple flap down motion. Using suitable hinge elements and shapes, a device may thus even be unfolded single-handed, with the end position predetermined by the designed angles between the device parts. All device parts are connected by hinge elements at all times.

The absolute device size is not essential for the inventive concept. Applying an inventive folding mechanism as described in the example embodiments above will allow to reduce the size of a closed device for pocketing to about one fourth of the original opened device size. Exemplary devices are palm-sized computers, personal assistants, mobile phones, pagers, mobile media players, laptops, and many other devices. Also, the functional elements on each of the device parts may vary. While the examples have been explained with respect to a display extending across the third and fourth device part, and a keyboard on the first and second device parts, these elements may be replaced and/or supplemented by others, interchanged, or changed in another suitable way.

Although exemplary embodiments of the present invention have been described, these should not be construed to limit the scope of the appended claims. Those skilled in the art will understand that various modifications may be made to the described embodiments and that numerous other configurations or combinations of any of the embodiments are capable of achieving this same result. Moreover, to those skilled in the various arts, the invention itself will suggest solutions to other tasks and adaptations for other applications. It is the applicant's intention to cover by claims all such uses of the invention and those changes and modifications which could be made to the embodiments of the invention herein chosen for the purpose of disclosure without departing from the spirit and scope of the invention.

What is claimed is:

1. An electronic device comprising
at least four device parts,
a first hinge element foldably connecting a first device part and a second device part along one edge of said first and second device parts,
a second hinge element foldably connecting a third device part and a fourth device part along one edge of said third and fourth device parts,
a third hinge element foldably connecting said first device part and said third device part along one edge of said first and third device parts, and
a fourth hinge element foldably connecting said second device part and said fourth device part along one edge of said second and fourth device parts,
wherein said third and fourth device parts include a display screen, and
wherein the edges connected to said first and second hinge elements are essentially orthogonal to the edges connected to said third and fourth hinge elements.

2. The electronic device of claim 1, wherein said device parts are essentially tabular in shape.

3. The electronic device of claim 1, wherein said first and second hinge elements both have a first hinging direction.

4. The electronic device of claim 3, wherein said third and fourth hinge elements both have a hinging direction opposite to said first hinging direction.

5. The electronic device of claim 1, wherein said display screen is a flexible display screen laminated onto a front side of said third and fourth device parts.

6. An electronic device comprising:
at least four device parts,
a first hinge element foldably connecting a first device part and a second device part along one edge of said first and second device parts;
a second hinge element foldably connecting a third device part and a fourth device part,
a third hinge element foldably connecting said first device part and said third device part, and
a fourth hinge element foldably connecting said second device part and said fourth device part,
wherein said third and fourth device parts include a display screen, wherein said display screen is a flexible display screen laminated onto a front side of said third and fourth device parts, and wherein said display screen extends across a contact edge of said third and fourth device parts.

7. An electronic device comprising
at least four device parts,
a first hinge element foldably connecting a first device part and a second device part along one edge of said first and second device parts;
a second hinge element foldably connecting a third device part and a fourth device part,
a third hinge element foldably connecting said first device part and said third device part, and
a fourth hinge element foldably connecting said second device part and said fourth device part,
wherein said first and second device parts include user input means,
wherein said hinge elements allow said device to assume at least a closed position and an opened position, and
wherein said first and second device parts are arranged in one common plane in said opened position.

8. The electronic device of claim 7, wherein said user input means comprise a keyboard.

9. The electronic device of claim 8, wherein said keyboard is divided onto said first and second device parts.

10. The electronic device of claim 7, wherein in said opened position a solid angle between said first device part and said third device part, or between said second device part and said fourth device part, is between 90 and 180 degrees.

11. The electronic device of claim 10, wherein the sum of included angles between the respective hinge elements is less than 360 degrees.

12. The electronic device of claim 11, wherein said included angles between said first and third hinge element and/or said first and fourth hinge element are less than said included angles in between said second and third hinge element and/or said second and fourth hinge element.

13. The electronic device of claim 12, wherein said included angles between said second and third hinge element and/or said second and fourth hinge element are greater than 90 degrees.

14. The electronic device of claim 7, wherein said first and second device parts are located on top of each other in said closed position.

15. The electronic device of claim 7, wherein the surface area of said device in said closed position is approximately one fourth of the surface area of said device in said opened position.

16. The electronic device of claim 7, wherein said device parts have essentially similar surface areas.

17. The electronic device of claim 7, wherein outer edges of said device parts are essentially flush in said closed position.

* * * * *